United States Patent [19]
Neufang

[11] 3,914,552
[45] Oct. 21, 1975

[54] PCM TIME-DIVISION MULTIPLEX SWITCHING PROCEDURE

[75] Inventor: Karlheinz Neufang, Munich, Germany

[73] Assignee: Siemens Aktiengesellschaft, Munich, Germany

[22] Filed: Mar. 26, 1974

[21] Appl. No.: 454,852

[30] Foreign Application Priority Data

Mar. 30, 1973 Germany ........................... 2316042

[52] U.S. Cl. ........................ 179/15 AQ; 179/15 AT
[51] Int. Cl.[2] ........................................ H04J 3/16
[58] Field of Search ...... 179/15 AQ, 15 AT, 15 BY, 179/18 ES:18 GF

[56] References Cited

UNITED STATES PATENTS

| | | | |
|---|---|---|---|
| 3,458,659 | 7/1969 | Sternung | 179/15 AQ |
| 3,637,941 | 1/1972 | Rekiere | 179/15 AQ |
| 3,715,505 | 2/1973 | Gordon | 179/15 AQ |
| 3,790,713 | 2/1974 | Neufang | 179/15 AT |

*Primary Examiner*—Ralph D. Blakeslee
*Attorney, Agent, or Firm*—Schuyler, Birch, Swindler, McKie & Beckett

[57] ABSTRACT

A PCM switching center is described wherein synchronization and signalling occur independently of entry of information into the address memories, the crosspoint controls between individual multiplex connections being directly accessed by a phase counter which determines the switching phases thereby momentarily bypassing the address memory of the switching center.

1 Claim, 1 Drawing Figure

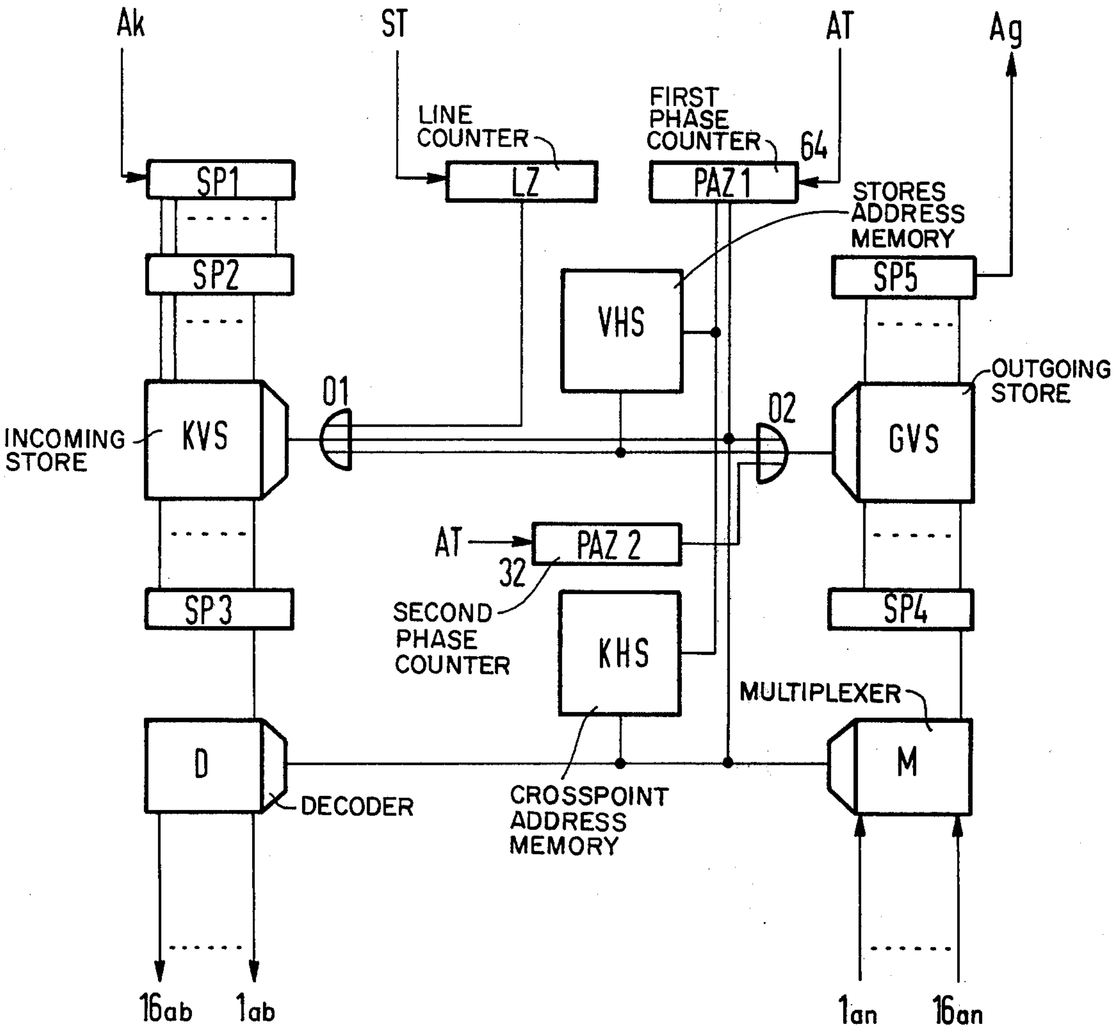
Ak
ST
AT
Ag
LINE COUNTER
FIRST PHASE COUNTER
64
SP1
LZ
PAZ1
STORES ADDRESS MEMORY
SP2
VHS
SP5
OUTGOING STORE
01
02
INCOMING STORE
KVS
GVS
AT
PAZ 2
32
SP3
SECOND PHASE COUNTER
KHS
SP4
MULTIPLEXER
D
M
DECODER
CROSSPOINT ADDRESS MEMORY
16ab
1ab
1an
16an

PCM TIME-DIVISION MULTIPLEX SWITCHING PROCEDURE

BACKGROUND OF THE INVENTION

The invention relates to a procedure for operating a PCM time-division multiplex communication network having a number of PCM time-division multiplex switching centers interconnected over four-wire time-division multiplex connections.

According to a prior PCM time-division multiplex communication network of this type, the PCM time-division multiplex switching centers are provided with storage centers assigned individually to each pair of conductors of the four-wire time-division multiplex connection for storing all the elements of information during a pulse frame — which is conditioned by the duration of the time-division multiplex system sampling period — coming in or to be retransmitted on the particular time-division multiplex connection and associated with communication channels. Crosspoint elements also form part of such time-division multiplex switching centers for space-division switching of elements of information, which are each connected to the crosspoints assigned over linking connections to the other time-division multiplex connections. Address memories are likewise provided, which bring about the space-division and time-division coordination of the operation of the crosspoint elements and of the storage locations assigned to the individual communication time slots. Finally, the prior art time-division multiplex switching centers have means for processing signals electronically, each of said means having access to the particular storages via a separate link connection. Such means are set up to receive and process switching signals, as well as to transmit switching signals and an element of synchronization information consisting of the frame keyword and a filler word. For transmission on the PCM time-division multiplex connections, the signals for all the communication time slots of a pulse frame are combined and transmitted during a specified time slot of said pulse frame, usually during time slot 16. The synchronization information is always transmitted in the same time slot, viz., time slot 0. Thereupon, in the PCM time-division multiplex switching centers, time slots are switched to the device for processing signals electronically. The time slots 0 and 16 mentioned above could be treated as the other communication time slots in which the actual telecommunication data are transmitted. For this purpose, the addresses of the storage rows allocated to the time slot 16 or 0 in the storages or of the link connections leading to the device for processing signals electronically would have to be entered into the address memories assigned to the storages, in each case in storage locations corresponding to idle switching phases. However, as a consequence, in the case of a replacement of the devices associated with a PCM time-division multiplex connection in the switching center, with which devices the address memories are also associated, or in the case of a substitution of the electronic signal processing means, the synchronization and signalling do not function properly from the start.

The same is true in the event that a separate line or a fixed time slot is provided for the transmission of the switching signals such that the signals pertaining to different speech circuits, identified by addresses, are transmitted in different pulse frames. In this case, the means for the electronic processing of signals are replaced by devices for the electronic matching of data, which primarily serve for the protection of data.

SUMMARY OF THE INVENTION

It is an object of the invention to operate a PCM communication network having switching centers of the type referenced above, such that synchronization and signalling occur independently of the entries into the address memories, so that in the case of a replacement of said address memories or of the electronic processing means for signals or electronic matching of data, the orderly operation of the switching center can be started immediately after said devices have been replaced.

This problem is solved by the invention in that in a PCM time-division multiplex communication network of the type referenced above the signals transmitted in a designated channel and synchronization information for the time-division multiplex connection transmitted in another designated channel are switched through during fixed switching phases from or to the particular device for the electronic processing of signals or for the electronic matching of data, for which the particular storages and cross-points are directly accessed during fixed switching phases by the phase counter which normally determines the switching phases and, therefore, normally cause the output of control addresses for the storages and cross-points through the address memories; thereby according to this method there is provided bypassing of the address memories.

BRIEF DESCRIPTION OF THE DRAWING

The method of the invention will be more readily understood by reference to the annexed drawing, which shows the elements of a PCM switching center, greatly simplified for better understanding, in conjunction with a single PCM time-division multiplex connection.

DETAILED DESCRIPTION OF PREFERRED EMBODIMENTS

It is assumed that devices for the electronic processing of signals are allocated to the time-division multiplex connections.

The drawing only shows a single PCM time-division multiplex connection with the incoming wire pair Ak and the outgoing wire pair Ag. A store is separately assigned to each of said pairs, viz., the incoming store KVS to the incoming pair Ak and the outgoing store GVS to the outgoing pair Ag. Further storages functioning as serial-to-parallel or parallel-to-serial converters are connected to each of said stores, each of said further storages being capable of storing 8 elements of information, that is to say, as many elements of information, as are transferred in a single communication time slot on the PCM time-division multiplex connections. The importance of said storages SP1, SP2 and SP3, which are connected to the incoming store KVS, and of the storages SP4 and SP5, which are connected to the outgoing store GVS, will be discussed hereinbelow.

For the space-division switching of elements of information from an incoming store to the outgoing store of the PCM time-division multiplex highway associated with the other PCM time-division multiplex highway associated with the connection to be set up, there are provided crosspoint elements designed in the form of a decoder D connected to the incoming store KVS or of a multiplexer M connected to the outgoing store GVS.

The decoder D has 16 output 1ab or 16ab and the multiplex M has 16 inputs 1an to 16an. Sixteen of said outputs or inputs are connected to link connections over which the decoder or the multiplexer are connected to multiplexers or decoders which are allocated to other PCM time-division multiplex connections (not shown). The 16th output and 16th input of decoder D or multiplexer M are each connected to a link connection over which access is gained to and from a device for the electronic processing of signals.

Address memories are assigned to each PCM time-division multiplex connection for the space and time-division coordination of the operation of the crosspoint elements (here, the decoder D and the multiplexer M and the storage locations of the stores assigned to the individual communication time slots). For the time-division multiplex connection with the pairs Ak and Ag illustrated in the drawing, these are the store address memory VHS, which serves to access the incoming store KVS and the outgoing store GVS, as well as the crosspoint-address memory KHS, which accesses the crosspoints. In a preferred embodiment, for the aforementioned coordination through the address memories, a greater number of switching phases are provided than the number of the communication time slots appearing on the time-division multiplex highways.

The line counter LZ, the first phase counter PAZ1, and the second phase counter PAZ2 likewise pertain to the devices which are allocated to the PCM time-division multiplex highways shown in the drawing.

The line counter LZ, which is stepped up by the system clock prevailing on the incoming pair Ak of the time-division multiplex highway, supplies the addresses of the communication time slots on said pair. The communication time slot addresses supplied thereby are routed to the incoming store KVS via an OR element 01.

The first phase counter PAZ1 is stepped up with the exchange clock AT prevailing in the PCM time-division switching center shown in the drawing and supplies the addresses of the switching phases, the number of which, as mentioned hereinabove, is increased in relation to the number of communication time slots on the time-division multiplex highways (e.g., 64). The switching phase addresses supplied by said first phase counter are normally employed to access the address memories VHS and KHS, which is indicated in the drawing by a connection linking a first outlet of said phase counter to inlets of the address memories. As will be explained hereinbelow, specified addresses supplied by the phase counter PAZ1 are employed for directly accessing the incoming store KVS, the outgoing store GVS, and the crosspoints. For this reason, a connection is shown in the drawing linking a second outlet of said phase counter PAZ1 on the one side to the OR element 01 mentioned above and, on the other, to a second OR element 02, over which the outgoing store GVS can be accessed; this second outlet is linked as well to the inlets of the decoder D and of the multiplexer M.

The second phase counter PAZ2 is likewise stepped up with the exchange clock or with a clock pulse train derived therefrom, and serves to produce the communication time slot addresses prevailing on the outgoing pair Ag. Accordingly, said counter also accesses the outgoing store GVS via the OR element 02.

The following processes take place in a call setup, in the course of which, for example, the channel K1 on the PCM time-division multiplex highway with the pairs Ak and Ag with a time slot K2 is to be switched to the switching phase p on another PCM time-division multiplex highway (not shown). The elements of information transmitted via the incoming pair Ak enters serially into the storage SP1 and are input in parallel form from there into the storage SP2 as a function of the system clock prevailing on said PCM time-division multiplex highway. They travel from here to the incoming store KVS in dependence on the exchange clock rate prevailing in the switching center, whereby the address of the storage rows of the store KVS allocated to individual channels is supplied to the store via the OR element 01 by the line counter LZ stepped through the system clock ST.

The elements of information associated with the time slot travel from the incoming store KVS to the storage SP3 following such storage. The interrelationship between the storage row allocated to the time slot K1 and the aforementioned switching phase p is established by the store address memory VHS, since the address of the time slot K1 is entered in the storage row of the address memory VHS, having 64 storage rows, which is allocated individually to the switching phase *p*. Thus, during the cyclic readout of the store address memory VHS as accessed by the phase counter PAZ1, the address of the time slot K1 reaches the switching phase p on its travel to the incoming store KVS via the OR element 01, so that the storage row thereof allocated individually to the time slot K1 is also read out to the switching phase.

In the crosspoint-memory address KHS, which also has 64 storage rows, the address of the link connection over which a connection can be set up to a designated other PCM time-division multiplex connection (not shown), is entered in the storage row allocated individually to the switching phase *p*. Since this crosspoint-address memory is likewise accessed by the phase counter PAZ1, and since it supplies driving addresses to the decoder D, among others, the elements of information of the time slot K1 held in the storage SP3 can travel in series to the aforementioned link connection via the decoder D and one of its outputs and likewise reach the switching phase *p*, being transmitted therefrom via a multiplexer and an outgoing store which are not shown, to the outgoing pair of the aforementioned other PCM time-division multiplex connection. In like fashion, the elements of information of the time slot K2 of the other PCM time-division multiplex highway in question travel in series to the store SP4 inserted before the outgoing store GVS via a link connection and the multiplexer M. When all the elements of information are entered into said storage, a parallel transmission takes place to the outgoing store GVS, namely, to the storage row thereof allocated individually to the time slot K1. The address of this storage row is again supplied to the switching phase in question, as described hereinabove, by the store address memory VHS and transmitted to the outgoing store GVS via the OR element 02.

The cyclic readout from the outgoing store GVS and, with it, the transmission of information to the rear-position storage SP5 is effected by the second phase counter PAZ2, which is likewise influenced by the exchange clock and which, in contradistinction to the first phase counter PAZ1, supplies only the addresses of 32 time slots which are assumed to be present on the PCM time-division multiplex highways. The time slot addresses produced by the second phase counter PAZ2 are likewise applied to the outgoing store via the OR element 02. Thereafter, the elements of information travel in series from the storage SP5 to the outgoing pair Ag of the PCM time-division multiplex connection.

As mentioned hereinabove, there is provided access to a device for electronic signal processing allocated individually to each PCM time-division multiplex connection from one of the outputs of the decoder D or of the inputs of the multiplexer M via a separate link connection. Said device receives signals arriving on the pair Ak for the communication time slots and sends signals to the outgoing pair Ag. It is also employed to send synchronization information to the outgoing pair Ag. The signals for the 30 speech channels found in a PCM time-division multiplex highway are combined and always transmitted to a designated time slot, usually the time slot 16. The transmission of the synchronization information likewise takes place in a fixed time slot, viz., the time slot 0. According to the invention, signals and synchronization information are switched with the help of the switching means of the switching center to and from the device for electronic signal processing. For this purpose, another switching phase is allocated to the two units of information that represent no speech information, for example, the switching phase 16 to the signals and the swtiching phase 0 to the frame keyword.

As described hereinabove in connection with the switching of speech information, the aforementioned allocation could be effected such that the addresses of the time slot 0 or of the time slot 16 are entered into the storage rows allocated individually to the switching phases 0 and 16. However, this is not done according to the invention, the store KVS and GVS as well as the crosspoints, i.e., the decoder D and the multiplexer M, being accessed directly by the first phase counter PAZ1 supplying the addresses of the 64 switching phases. This is indicated in the drawing by the connection of a second output of said phase counter PAZ1 to the inputs of the decoder D of the multiplexer M, which exists in addition to the connection of said output to inputs of the OR elements 01 and 02.

Owing to the procedure according to the invention, instructions to enter the address of the time slots 16 and 0 into the address memories are not necessary. Moreover, it is assured that in the case of replacement of a device for electronic signal processing or of all the switching means described hereinabove, which are often combined into a module to simplify expansion, synchronization and signalling can again occur automatically after the replacement.

What is claimed is:

1. A procedure for operating a PCM time-division communication network having a number of PCM time-division multiplex switching centers connected to one another via four-wire time-division multiplex connections, said PCM time-division mutiplex switching centers having storage devices individually assigned to each pair of conductors of one of the four-wire time-division multiplex connections to store all the elements of information coming in or to be retransmitted on one of the time-division multiplex connections during a pulse frame, the pulse frame being determined by the duration of the time-division multiplex system sampling period, said centers further having crosspoint elements for the space-division switching of the elements of information, link connections connecting said crosspoint elements to the crosspoints allocated to the other time-division multiplex connections and address memories which produce the space and time-division coordination of the operation of said crosspoint elements and of the storage locations assigned to the individual communication time slots, further having means for electronic signal processing and data matching, each having access to the particular storage device of a switching center via a separate line connection, characterized in that the signals transmitted in a specified communication channel (e.g., 16) and the synchronization information for the time-division multiplex connection transmitted in another specified communication channel (e.g., 0) during fixed switching phases (e.g., 0 or 23) are switched to and from the particular device for electronic signal processing or data matching, for which the particular storage (KVS, GVS) and crosspoint controls (D,M) are directly accessed during the fixed swtiching phases by the phase counter (PAZ1) which determines the switching phases and therefore normally cause the output of selection addresses from the storages and crosspoints by the address memories (VHS, KHS) bypassing the address memories.

* * * * *